Jan. 23, 1945.  B. JORGENSEN  2,367,782
CONTROLLING MEANS FOR FLUID-OPERATED MACHINES
Filed June 23, 1943  3 Sheets-Sheet 2

INVENTOR
Bernhardt Jorgensen
By his Attorney

Patented Jan. 23, 1945

2,367,782

UNITED STATES PATENT OFFICE 2,367,782

CONTROLLING MEANS FOR FLUID-OPERATED MACHINES

Bernhardt Jorgensen, Marblehead, Mass., assignor to United Shoe Machinery Corporation, Flemington, N. J., a corporation of New Jersey Application June 23, 1943, Serial No. 491,875

12 Claims. (Cl. 60—97)

This invention relates to fluid-operated machines, and more particularly to means for controlling the operation of such machines. The invention is herein illustrated as applied to a fluid-operated toe-lasting machine for use in the manufacture of shoes, constructed generally as disclosed in an earlier application of mine, Serial No. 377,347, filed on February 4, 1941, issued July 20, 1943, as Patent No. 2,324,509. It will be understood, however, that the invention is not limited to machines of that particular character.

The machine shown in the above-mentioned application includes in its organization a plurality of fluid-operated mechanisms, a pressure chamber in which fluid is maintained under pressure by a pump, valves for controlling the admission of fluid from the pressure chamber to the differnet mechanisms, and fluid-operated valve-controlling means rotatable to cause the different mechanisms to operate in predetermined time relation to one another in a cycle of operations of the machine. The rotatable valve-controlling means is itself controlled by a valve which is movable in response to depression of a treadle to start the cycle of operations and is thereafter automatically movable to stop the machine at the end of the cycle. For purposes of this invention the construction herein shown includes additional means for controlling this valve in such manner as to enable the operator to stop the machine at will prior to the end of the cycle in case, for example, the condition of the work makes it desirable to do so. In the machine to which the invention is shown as applied the valve is held by a latch in position to cause the machine to operate and is returned by a spring to stop the machine when released by the latch at the end of the cycle; and to stop the machine prior to the end of the cycle the above-mentioned additional valve-controlling means is arranged to act on this latch to release the valve. Since pressure is still maintained by the pump in the pressure chamber when the machine is thus stopped, the operator, after correcting some undesirable condition of the work, may cause the machine to continue its cycle merely by again depressing the treadle. Conditions, however, may sometimes be such that it is desirable to operate on the work anew from the beginning of the cycle. In that case the operator may stop the pump and turn the rotatable valve-controlling means by hand into position for the beginning of a new cycle. To relieve the operator of any special concern as to how far to turn the valve-controlling means and to insure that it will be in exactly the right position, the invention further provides a stop member for limiting its turning movement, together with means for rendering the stop member inoperative as an incident to the next starting of the machine.

The above and other features of the invention, including various novel details of construction and combinations of parts, will now be more particularly described with reference to the accompanying drawings and thereafter pointed out in the claims.

Figure 1:
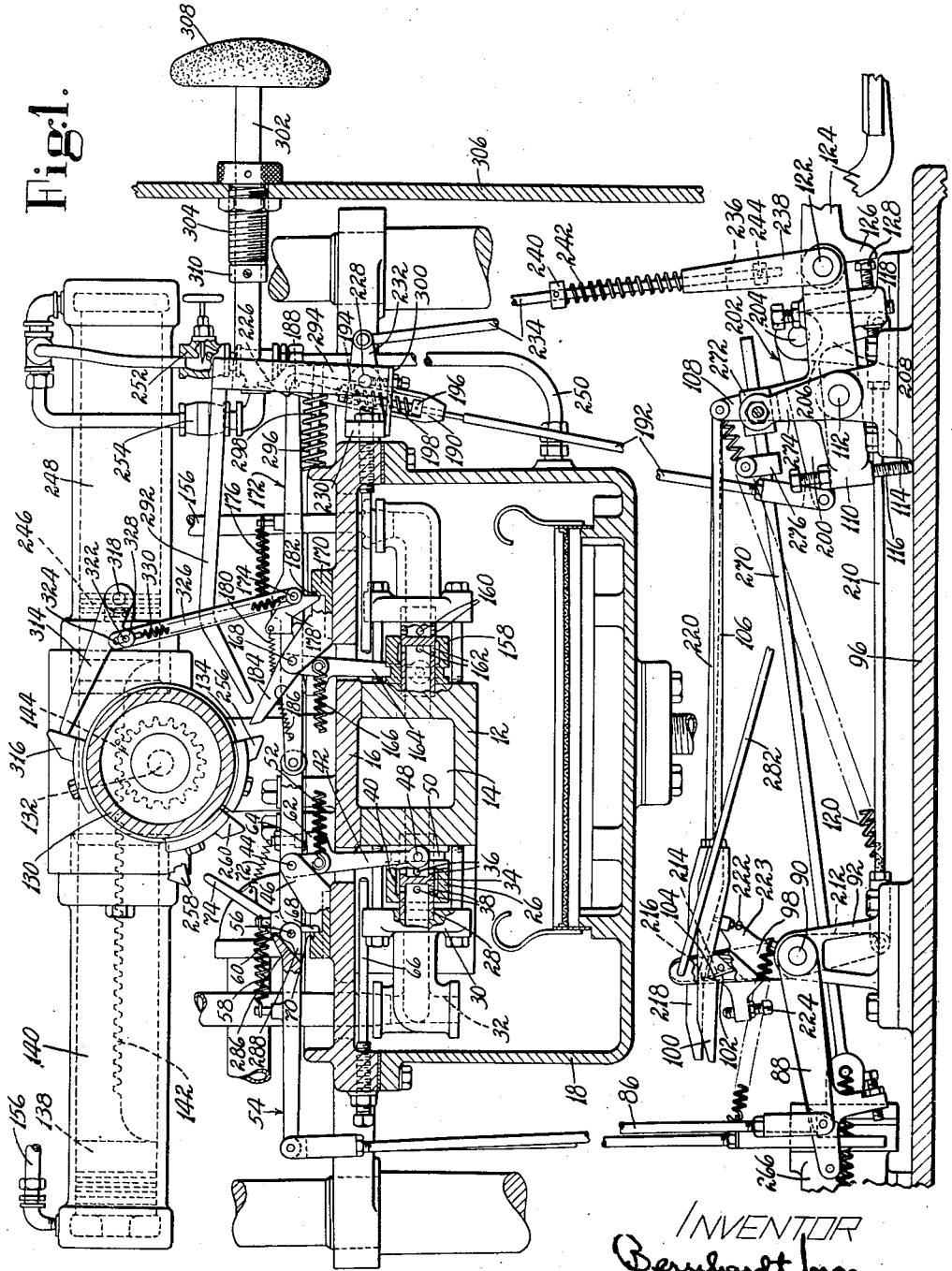
Fig. 1 is a view partly in left-hand side elevation and partly in section of the lower portion of the machine to which the invention is herein shown as applied.
Figure 4:
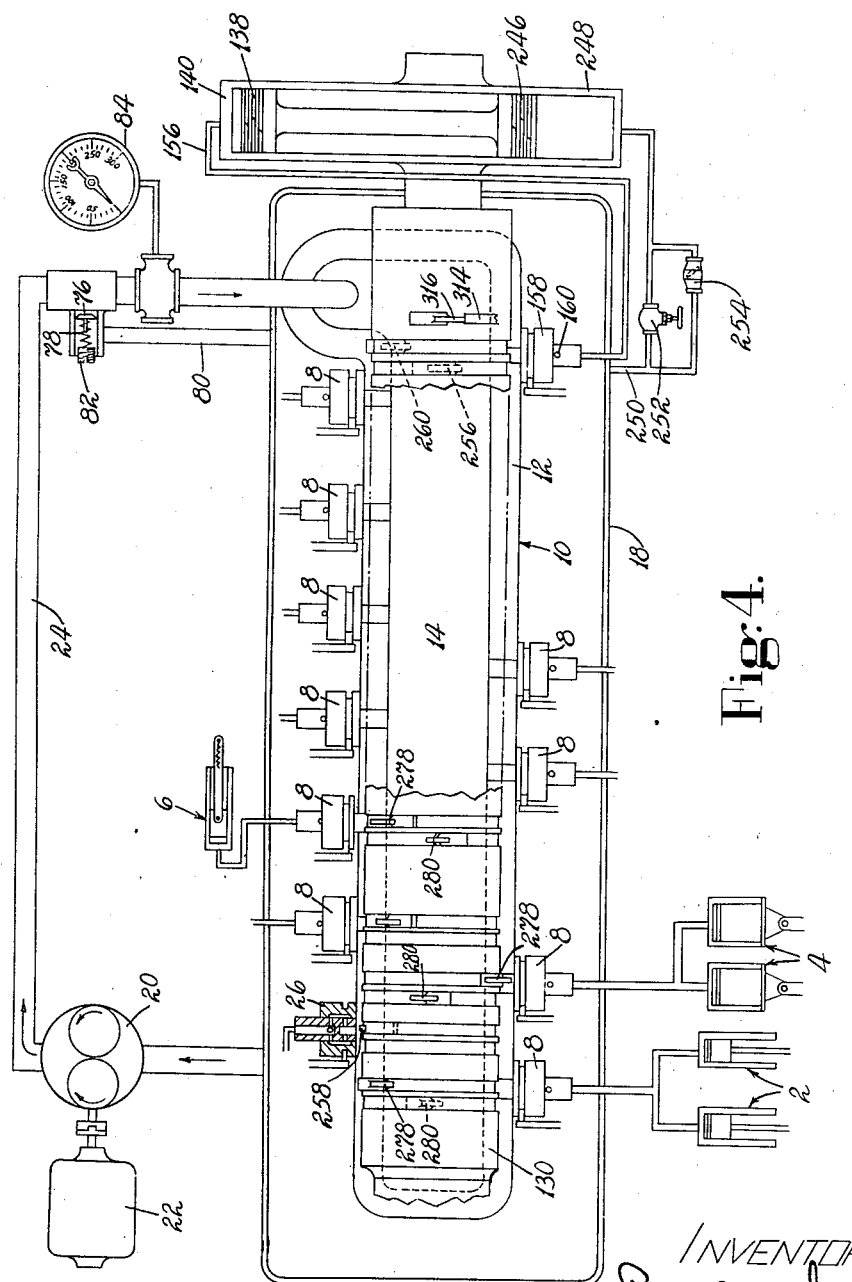
Fig. 4 is mainly a diagrammatic view illustrating the relation of some of the fluid-operated mechanisms to the source of operating fluid and to the means for automatically controlling their operations.

As fully disclosed in the previously mentioned application, the machine is provided with a plurality of fluid-operated mechanisms which are operated in predetermined time relation to one another in the course of a cycle of power operations of the machine. Portions of some of these mechanisms, comprising cylinder-and-piston devices, are shown diagrammatically in Fig. 4, as indicated generally by the reference characters 2, 4 and 6. The mechanisms thus shown, as well as those which for convenience are omitted from Fig. 4, are supplied with operating fluid at the appropriate times in the cycle of operations, through corresponding automatically controlled valves 8, from a source of fluid supply 10 which comprises a casting 12 (Figs. 1 and 4) having therein a chamber 14 communicating with the various valves. The casting 12 is secured to the lower face of a horizontal plate 16 (Fig. 1) which serves as a closure for the top of the chamber 14. Secured also to the plate 16 is a casting 18 which serves as a reservoir or sump for fluid under atmospheric pressure. A pump 20 (Fig. 4) driven continuously by an electric motor 22 draws fluid, which is preferably light oil, from the reservoir 18 and delivers the fluid through a pipe 24 into the chamber 14. When the machine is not in operation the fluid is returned freely to the reservoir 18, without developing any substantial pressure in the chamber 14, through a valve 26 (Figs. 1 and 4). This valve is a sleeve valve slidingly movable on a tube 28 clamped tightly between the casting 12 and a coupling 30 and communicating respectively at its opposite ends with the chamber 14 and with a passage 32 opening into the reservoir 18. The tube 28 has therein a partition 34 which closes communication between its opposite ends, and extending through the tube at opposite sides of this partition respectively are two sets of ports 36 and 38. The valve 26 is provided with an annular chamber 40 through which these two sets of ports are in communication with each other when the valve is in its normal position against the casting 12, as illustrated, so that the fluid is permitted to escape freely from the chamber 14.

To interrupt the escape of the fluid from the chamber 14, so that pressure will be developed in the chamber, the valve 26 is moved into position to close the ports 36. The valve is controlled by an arm 42 which is pivotally mounted at its upper end on a pin 44 supported on a bracket 46 fast on the plate 16. At its lower end the arm carries a pin 48 extending into an annular groove 50 in the valve 26. so that the valve may be moved along the tube 28 by the arm. A spring 52 connected to the arm holds the valve normally against the casting 12. Also pivotally mounted on the pin 44 is a lever 54 comprising two parts pivotally connected together by a pin 56 at the rear of the pin 44, the two parts of the lever being held normally by a spring 58 in a fixed relation to each other determined by the interengagement of shoulders on the parts at 60. Between the forwardly extending arm of the lever 54 and a lug 62 on the arm 42 is a small compression spring 64. Through this spring the arm 42 is operated to move the valve 26 into position to close the ports 36 in response to movement of the lever 54 as a whole in a clockwise direction as the parts are viewed in Fig. 1, this movement of the arm 42 being limited by its engagement with a rod 66 threaded in the plate 16. The spring 64 is stronger than the spring 52 and yields only upon engagement of the arm 42 with the rod 66. When the lever 54 is thus operated, by means hereinafter described, it is held against return movement, to prevent return of the valve 26. by a latch 68 which is mounted on the pin 56 and normally rests against a vertical face on the bracket 46, as shown, but in response to the movement of the lever is lifted to a position where it is swung over a horizontal shoulder 70 on the bracket. A spring 72 connected to an upwardly extending arm 74 of the latch swings the latch into this position, where it normally remains until it is swung from over the shoulder 70 by automatic means acting on the arm 74, as hereinafter described. It will be understood that when the lever 54 is thus released by the latch 68 the spring 52 returns the valve 26 to its initial position to terminate the pressure in the chamber 14. When the valve is moved into position to close the ports 36 as above described, the pressure thus established in the chamber 14 is limited by a relief valve 76 (Fig. 4), this valve being controlled by a spring 78 against the resistance of which it is opened by the pressure of the fluid to permit fluid to return to the reservoir 18 through a by-pass 80. The pressure of the fluid in the chamber 14, therefore, depends upon the strength of the spring 78 which is adjustably variable by means of a screw 82. A gage 84 connected to the pipe 24 serves to indicate the amount of pressure developed in the chamber 14.

Figure 2:
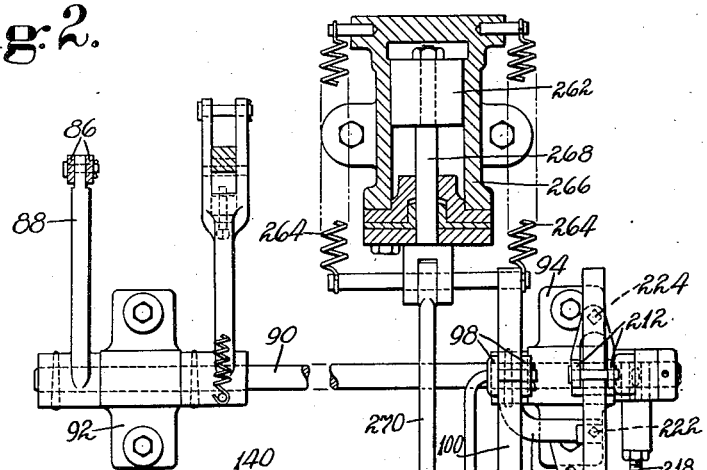
Fig. 2 is a view partly in plan and partly in section of a portion of the controlling means shown near the bottom of Fig. 1.

The swinging of the lever 54 to operate the valve 26 as above described is effected by upward movement of a rod 86 connecting the lever to an arm 88 fast on a rockshaft 90 mounted in brackets 92 and 94 (Fig. 2) on the base 96 of the machine. Also fast on this rockshaft is an upwardly extending arm 98 which is forked at its upper end, and between its forks is mounted a latch 100 which rests on a triangular block 102 (Fig. 1) fast on the arm and is provided with a substantially vertical shoulder 104 arranged to engage and to act on the block. The latch 100 is connected by a rod 106 to an upwardly extending arm 108 of a three-armed treadle lever 110 fast on a rockshaft 112 which is mounted on a bracket 114 on the base of the machine. Screws 116 and 118 carried by this lever are arranged to engage the base to limit movements of the lever in opposite directions. A spring 120 connected to the arm 108 holds the lever 110 normally in the position determined by the screw 116. The front end of the lever 110 is forked and carries a pin 122 on which is mounted a treadle 124 provided with a lug 126 arranged to engage a screw 128 in the lever to determine adjustably the height of the treadle relatively to the lever. It will be evident that upon depression of the treadle 124 the resulting forward movement of the rod 106 causes the latch 100 to swing the arm 98 forwardly and thus to lift the rod 86 to swing the lever 54, thereby moving the valve 26 into position to establish pressure in the chamber 14. By reason of the action of the valve-controlling latch 68 the rod 86 remains uplifted when the treadle 124 is released by the operator, and the latch 100 moves rearwardly along the block 102 as the treadle is returned to its starting position by the spring 120.

Figure 3:
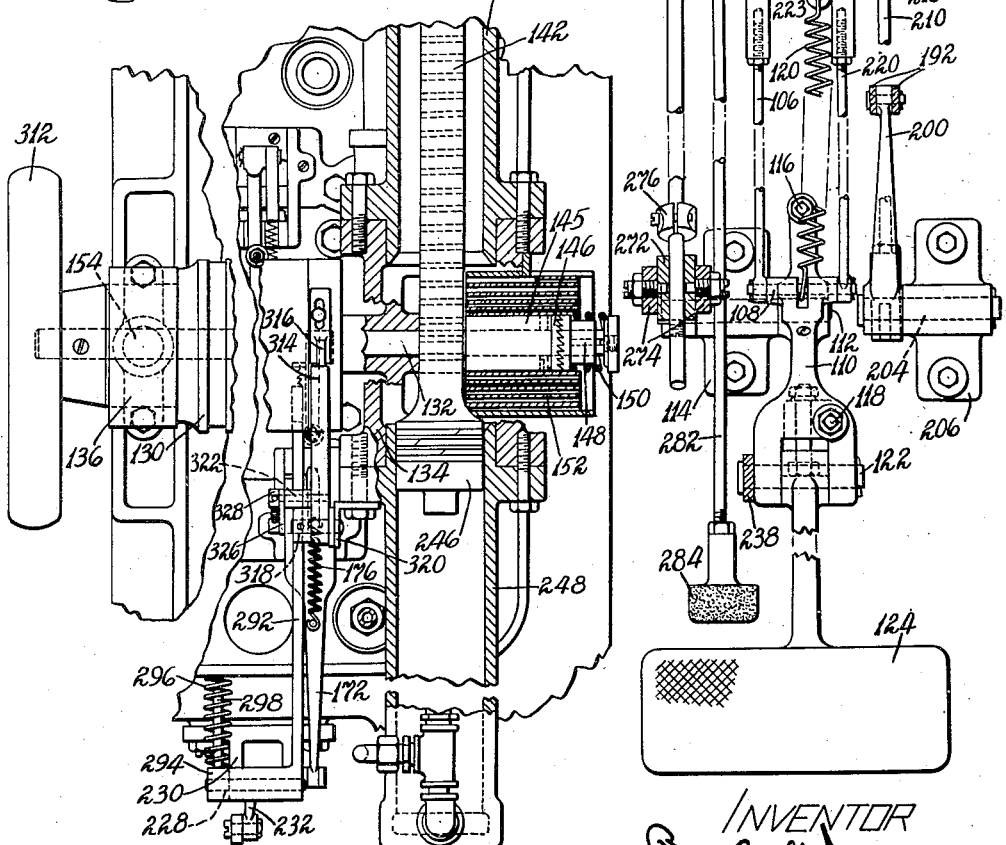
Fig. 3 shows a portion of the structure also partly in plan and partly in section, parts being broken away.

After having established pressure in the chamber 14 by depression of the treadle 124, as above described, the operator starts the cycle of automatic operations of the machine by again depressing the treadle. The cycle of operations corresponds to one complete rotation of a valve-controlling device which differs somewhat in construction from that shown in the previously mentioned application and comprises a drum 130 provided with means hereinafter referred to for actuating the various valves 8 in predetermined time relation to one another. The drum is provided at one end with a short shaft 132 mounted in a bearing in a bracket 134 and is itself rotatably mounted at the other end in a bearing 136 (Fig. 3). The drum is turned in one direction by a motor comprising a fluid-operated piston 138 movable in a cylinder 140 secured to the bracket 134, the piston having integral therewith a rack bar 142 the teeth of which are in engagement with a pinion 144 loose on the shaft 132. As disclosed in greater detail in the previously mentioned application, the hub 145 of this pinion is connected to a clutch member 146 (Fig. 3) having ratchet teeth engaged by other ratchet teeth formed on a cooperating clutch member 148 which is keyed to the shaft 132 but may move lengthwise of the shaft against the resistance of a spring 150. The teeth on these clutch members are so arranged that the drum 130 is rotated by the movement which the piston 138 receives from fluid admitted to the cylinder 140, but when the fluid is released from the cylinder the teeth of the clutch member 146 slip past the teeth of the member 148 to permit the is a pipe 250, and in this pipe is an adjustable needle valve 252. When the piston 138, therefore, is operated to turn the drum 130, fluid in the cylinder 248 is forced into the reservoir 18 past the needle valve 252 at a rate depending upon the adjustment of the valve. When the piston 138 is returned by the spring 152 fluid is drawn into the cylinder 248 from the reservoir by the piston 246, the fluid being by-passed around the needle valve 252 through a check valve 254.

Mounted on the periphery of the drum 130 is a finger 256 arranged to engage and to swing the latch-controlling lever 184 to cause the valve 158 to be returned to its initial position and thereby to terminate the cycle of operations of the machine. Also carried by the drum is a finger 258 arranged to act at substantially the same time to swing the latch arm 74 and thereby to cause the valve 26 to be returned to its initial position to release the pressure in the chamber 14. In the machine shown in the previously mentioned application, for reasons which need not be herein explained, it is desired also to stop the operation of the machine temporarily before the end of the cycle, and for this purpose the drum 130 carries another finger 260 arranged to act on the lever 184 prior to the action of the finger 256 on the lever. After the machine has thus been stopped temporarily it is automatically started again, after a predetermined interval, by means of a piston 262 (Fig. 2) movable against the resistance of return springs 264 by fluid admitted to the rear end of a cylinder 266. The piston 262 is fast on a piston rod 268 pivotally connected to a forwardly extending rod 270 which is slidingly mounted near its front end in a trunnion block 272 supported on the forked upper end of an arm 274 fast on the previously mentioned rockshaft 112 secured to the treadle lever 110. In response to the forward movement of the rod 270 a collar 276 fast on the rod engages the trunnion block 272 and swings the treadle lever 110 to start the drum 130 again in operation. The collar 276 is initially spaced from the trunnion block 272 to provide the desired interval before the drum is thus started. To this end also movement of the piston 262 is somewhat retarded by means not herein shown but fully described in the above-mentioned application.

The previously mentioned valves 8 for controlling the admission and exhaust of fluid to and from the various operating mechanisms with which the machine is provided are like the valve 158 and operate in the same manner. That is, each valve by movement in one direction admits fluid to the operating mechanism associated therewith and by movement in the opposite direction releases the fluid from that mechanism. Associated with those valves which are located at the front of the chamber 14 are valve-controlling mechanisms similar to that provided for controlling the valve 158, and associated with the valves at the rear of the chamber are valve-controlling mechanisms similar to that for controlling the valve 26, except that in all but one instance, which need not be discussed in detail, the operation of these mechanisms is wholly automatic. That is, each valve-operating lever, corresponding to the previously mentioned lever 54 or 172, is swung in the valve-operating direction by a finger on the drum 130 acting on the inner end portion of the lever, and associated with each of these valve-operating fingers is another finger on the drum for thereafter operating a member corresponding to the previously mentioned member 74 or 184 to release the valve and to cause it to be returned to its initial position. The valve-operating fingers on the drum which are associated, for example, with the operating mechanisms 2, 4 and 6, are identified in Fig. 4 by the reference characters 278 and the valve-releasing fingers by the reference characters 280. The valve-operating mechanisms associated with these fingers are not shown herein, in view of their similarity to the previously described mechanisms shown in Fig. 1 for controlling the valves 26 and 158 and in view of the disclosure in the previously mentioned application.

For reasons fully disclosed in the above-mentioned application and which need not be herein explained, it may be desired, after pressure has been established in the chamber 14 in the manner hereinbefore described by the first depression of the treadle 124, to release the pressure instead of proceeding immediately with the operation of the machine. For this purpose there is provided a rod 282 slidingly mounted in a bearing (not shown) at the front of the base of the machine and provided on its front end with a pad 284 (Fig. 2) which the operator may engage with his foot, the rear end of the rod being connected to the upper end of the arm 98. By rearward movement of this rod the arm 98 is swung rearwardly to cause the arm 88 to pull downwardly on the rod 86. This causes the rear part of the two-part lever 54 to swing downwardly about the pin 56 against the resistance of the spring 58. In this operation an inclined face 286 on the rear part of the lever acts on a tail portion 288 of the latch 68 to swing the latch into position to release the lever 54, so that the valve 26 is returned by the spring 52 to its initial position to provide a free outlet for the fluid in the chamber 14.

As thus far described, the construction herein shown, except as noted, may be assumed to be the same as disclosed in the previously mentioned application. In the use of the lasting machine therein shown it may sometimes be desired to stop the machine before it is stopped by the automatic means provided for that purpose, to enable the operator to correct some faulty condition of the work or possibly to permit the shoe to be removed and thereafter to be operated upon anew from the beginning of a cycle of operations. The machine may, of course, thus be stopped at any time by means of the previously mentioned rod 282, the function of which is to terminate the pressure in the chamber 14. In view, however, of the nature of the construction of the machine and the fact that the parts operated by fluid pressure are mostly returned to their starting positions by springs or by gravity upon release of the fluid acting thereon, there are times in the cycle when such use of the rod 282 to stop the machine might involve danger of breakage of parts. For purposes of this invention, therefore, the construction herein shown is such as to enable the operator to stop the machine at will while pressure is still maintained in the chamber 14. This is done by control of the valve 158 whereby fluid is admitted to the cylinder 140 for rotating the drum 130. That is, in order to stop the machine at will, mechanism is provided for swinging the latch-controlling lever 184 to release the valve-operating lever 172 and thus to cause the valve 158 to be returned to its initial position by the spring 166. This mechanism includes a forwardly and rearwardly extending bar 292 the rear end portion piston 138 to be returned to its initial position without reverse movement of the drum 130. Such return of the piston is effected by a spiral spring 152 connected to the hub 145 of the pinion 144. Reverse movement of the drum is prevented by a spring-pressed plunger 154 which engages the left-hand end of the drum underneath and acts as a brake thereon.

Fluid is admitted to the cylinder 140 through a pipe line 156 (Figs. 1 and 4) which leads from the chamber 14, the admission of the fluid to and its exhaust from the cylinder being controlled by a valve 158 which is similar to the previously mentioned valve 26. When the valve 158, however, is in its initial position against the casting 12 it uncovers ports 160, and, accordingly, the cylinder 140 is open to exhaust. Admission of fluid to the cylinder 140 results from movement of the valve 158 toward the right (Fig. 1) to cause the ports 160 to communicate with other ports 162 leading to the chamber 14. The valve is controlled by mechanism generally similar to that previously described for controlling the valve 26. Movements of the valve are effected through an arm 164 similar to the previously mentioned arm 42 and controlled by a spring 166. The arm 164 is pivotally mounted at its upper end on a pin 168 supported on a bracket 170 on the plate 16, and pivotally mounted also on this pin is a two-part lever 172 by movement of which in a counterclockwise direction (Fig. 1) the arm 164 is swung against the resistance of the spring 166 to move the valve 158 into position to admit fluid to the cylinder 140. The two parts of the lever 172 are pivotally connected together by a pin 174 and are held normally in fixed relation to each other by a spring 176, similarly to the previously mentioned lever 54. Pivotally mounted also on the pin 174 is a latch 178 controlled by a spring 180 which swings it into position over a shoulder 182 on the bracket 170 when the lever 172 is swung in the direction to operate the valve 158. By this latch, therefore, the valve 158 is retained in position to admit fluid to the cylinder 140. The latch is swung in a clockwise direction to release the lever 172 and thus to permit the valve 158 to be returned to its initial position by the spring 166 by means of a lever 184 which is pivotally mounted on the pin 168 and one arm of which bears upwardly against a shoulder on the latch, the arm being held against this shoulder by a light spring 186 connected to the lever 184. The lever 184 is operated by means hereinafter referred to on the drum 130.

It will be understood from the above description that the starting of the drum 130 results from upward movement of the front end of the lever 172. For thus operating the lever there is connected to a pin 188 on its front end a yoke 190 in which is slidingly mounted the reduced upper end portion of a rod 192. The rod extends through the lower end of the yoke and through a transverse wall 194 of the yoke, between which wall and a collar 196 fast on the rod is a spring 198. Through this spring, therefore, upward movement is imparted yieldingly by the rod to the yoke. At its lower end the rod 192 is pivotally connected to a rearwardly extending arm 200 of a bell-crank lever 202 which is mounted to swing about a pin 204 supported in a bracket 206 on the base of the machine. A downwardly extending arm 208 of the bell-crank lever is connected by a link 210 to the lower arm of a lever 212 mounted between its ends to swing on the previously mentioned rockshaft 90. The upper arm of the lever 212 is forked and is provided between its forks with a triangular block 214 (Fig. 1) arranged to be engaged by a substantially vertical shoulder 216 formed on a latch 218 mounted between the forks of the lever. This latch is connected by a rod 220 to the previously mentioned upwardly extending arm 108 of the treadle lever 110. Accordingly, depression of the treadle 124 causes the latch 218 to swing the lever 212 in the direction to raise the rod 192 and thereby to move the valve 158 into position to start the drum 130. When the treadle, however, is depressed the first time, as hereinbefore described, it is ineffective thus to raise the rod 192 by reason of the fact that the latch 218 is held by a screw 222 mounted in a projection 223 on the previously mentioned arm 98 at such a height that its shoulder 216 will not engage the triangular block 214. It will be understood that since the arm 98, which is swung forwardly by the first depression of the treadle and, therefore, causes its screw 222 to lower the latch 218, is held against return movement by the valve-controlling latch 68, the latch 218 is ready to act on the lever 212 in response to the next depression of the treadle. A screw 224 carried by the lever 212 lifts the latch 218 and disengages it from the block 214 near the end of the depression of the treadle to permit the machine to be stopped automatically at the proper time if the operator should continue to hold the treadle depressed.

As illustrated in Fig. 1, an end of the previously mentioned pin 188 which connects the yoke 190 to the valve-operating lever 172 is normally engaged by a latch 226 mounted to swing about a pin 228 supported in a bracket 230 on the plate 16. This latch, until it is swung from over the pin, therefore prevents such upward movement of the lever 172 as to start the drum 130. An arm 232 is fixed relation to the latch is pivotally connected to a downwardly extending rod 234 the lower end of which is slidingly movable in a laterally offset portion 236 of a bar 238 pivotally connected by the previously mentioned pin 122 to the treadle lever 110. Between the laterally offset portion 236 of the bar and a collar 240 fast on the rod 234 is a spring 242, and fast on the lower end of the rod below the offset portion is a collar 244 which is normally spaced from the offset portion as shown in Fig. 1. Accordingly, it is not until near the end of the depression of the treadle that the latch 226 is swung from over the pin 188 by the engagement of the offset portion 236 of the bar 238 with the collar 244, prior to which time the spring 198 is compressed by the upward movement of the rod 192. The valve 158 is, therefore, moved suddenly by the spring 198 into position to start the drum 130, thus insuring that the ports 160 through which the fluid is admitted to the cylinder 140 will be instantly opened to their full extent. It will be understood that the latch 226 is returned to its initial position by the spring 242 after the operator has released the treadle and after the valve-operating lever 172 has returned to its initial position.

For controlling the speed of rotation of the drum 130 and for thereby determining the time which it takes for the machine to perform its cycle of operations there is rigidly connected to the rack bar 142 a piston 246 movable in a cylinder 248 in line with the cylinder 140 and filled with fluid from the reservoir 18. Leading from the reservoir to the front end of the cylinder 248 of which extends downwardly into position to engage and act on the lever 184 when the bar is moved rearwardly. A portion of the bar near the front of the machine extends widthwise of the machine and then downwardly, as shown at 294, to a position where it is secured to one end of the previously mentioned pin 228 which is mounted to turn in the bracket 230. The bar therefore swings about the axis of the pin 228 to operate the lever 184, and it is returned by a spring 296 mounted between its downwardly extending portion 294 and a flange on the plate 16, the spring being held in place by a pin 298 mounted on the portion 294 of the bar. Forward swinging movement of the bar by the spring 296 is limited by a plate 300 fast on the lower end of its downwardly extending portion 294 and arranged to engage the bracket 230. For imparting the rearward swinging movement to the bar 292 there is provided a plunger 302 slidingly mounted in a bushing 304 secured in a vertical plate 306 at the front of the machine. The rear end of the plunger is arranged to engage the bar 292, and on its front end is a pad 308 in position to be conveniently engaged by the operator's right knee, so that the machine may be stopped instantly at any desired time. A collar 310 fast on the plunger 302 serves by engagement with the bushing 304 to limit forward movement of the plunger.

After having stopped the machine as above described, if conditions are such as not to require a repetition of operations already performed, all that the operator needs to do to cause the machine to continue and complete its cycle is again to depress the starting treadle 124. If it should be desired, however, to operate on the shoe anew from the beginning of the cycle, the operator stops the operation of the pump 20 by a switch (not shown) which controls the electric motor 22, so that no more fluid will be forced into the chamber 14, and then completes the rotation of the valve-controlling drum 130 by a hand wheel 312 (Fig. 3) secured to its left-hand end to bring it into position to begin a new cycle of operations and to cause all parts not already in their starting positions to be returned properly to those positions. The operator thereafter starts the pump again and, after having properly presented the shoe once more, proceeds as before to cause the development of pressure in the chamber 14 by one depression of the treadle and to start the machine by another depression of the treadle.

When the operator turns the drum 130 by hand as above described, it is important to stop its movement at exactly the right point or the beginning of the cycle. Because of the teeth on the clutch members 146 and 148, if the operator should turn the drum too far he would have to turn it all the way round again. In order to relieve the operator of any concern as to how far to turn the drum, and to insure that it will be in exactly the right starting position, the construction herein shown further includes an arm 314 arranged to engage a finger 316 fast on the drum to stop the drum at the proper point. The arm 314 is in the path of the finger 316 when the drum is turned by the operator, but it is pivotally mounted on a pin 318 to permit it to be swung upwardly to clear the finger when the machine is started. The pin 318 is fast on a bracket 320 (Fig. 3) secured to a flange on the cylinder 240. Mounted on the arm 314 is a pin 322 extending through a slot 324 formed in the upper end portion of a link 326 which extends downwardly and is pivotally mounted at its lower end on the previously mentioned pin 174 of the valve-controlling lever 172. A collar 328 fast on the pin 322 holds the upper end of the link 326 in place on the pin. A spring 330 connected to the collar 328 and to the pin 174 holds the pin 322 normally at the lower end of the slot 324. When, therefore, the forwardly extending arm of the lever 172 is swung upwardly by the treadle 124 to move the valve 158 into position to start the operation of the machine, the link 326 is moved upwardly by the lever and imparts upward swinging movement to the stop arm 314 to withdraw it from the path of the finger 316. This permits the drum 130 to be turned by the fluid admitted to the cylinder 140. It will be evident that when the lever 172 is released by the latch 178 and is returned to its starting position, as it is, for example, in response to the movement of the bar 292 by the operator to stop the operation of the machine, the arm 314 is swung downwardly again into the path of the finger 316. It will also be evident that when the lever 172 is released automatically by the action of the finger 256 on the lever 184 at the end of the cycle of operations, the arm 314 likewise is swung downwardly into the path of the finger 316, thus insuring positively against any overrunning of the drum 130. The purpose of the slot 324 in the link 326 is to permit the operator to stop the machine by movement of the bar 292, if he should desire to do so, immediately after starting it. If it were not for this slot engagement of the arm 314 with the top of the finger 316 would at that time prevent such return movement of the lever 172 as to permit the valve 158 to be returned by the spring 166 to its initial position. It will be understood that the spring 330 is not strong enough to prevent the valve from being returned by the spring 166 if the arm 314 should be engaged underneath by the finger 316.

Having described the invention, what I claim as new and desire to secure by Letters Patent of the United States is:

1. In a fluid-operated machine, a plurality of fluid-operated mechanisms, valves for controlling the admission of fluid respectively to said different mechanisms, controlling means movable to initiate the operations of the different mechanisms in predetermined time relation to one another by control of said valves, a fluid-operated device for thus operating said controlling means, a valve for admitting operating fluid to said device, said valve being movable in response to the operation of said controlling means to terminate automatically the admission of fluid to said device and thereby to stop the operation of the machine, and means movable by the operator for also controlling said valve to stop the operation of the machine before it is stopped by said fluid-operated controlling means.

2. In a fluid-operated machine, a plurality of fluid-operated mechanisms, valves for controlling the admission of fluid respectively to said different mechanisms, controlling means rotatable to initiate the operations of the different mechanisms in predetermined time relation to one another by control of said valves, a fluid-operated device for thus rotating said controlling means to cause the machine to perform a cycle of operations, a valve for admitting operating fluid to said device, means for moving said valve thus to admit the fluid and for thereby starting the cycle of operations, a portion of said controlling means being arranged to control said valve to terminate automatically the admission of fluid to said device and thereby to stop the machine at the end of the cycle, and means movable by the operator for also controlling said valve to stop the machine prior to the end of the cycle.

3. In a fluid-operated machine, a plurality of fluid-operated mechanisms, valves for controlling the admission of fluid respectively to said different mechanisms, controlling means rotatable to initiate the operations of the different mechanisms in predetermined time relation to one another by control of said valves, a fluid-operated device for thus rotating said controlling means to cause the machine to perform a cycle of operations, a valve for admitting operating fluid to said device, a treadle for controlling said valve to cause it thus to admit the fluid and for thereby starting the cycle of operations, said valve being movable in response to the rotation of said controlling means to terminate automatically the admission of fluid to said device and thereby to stop the machine at the end of the cycle, and means movable by the operator independently of said treadle for also controlling said valve to stop the machine prior to the end of the cycle.

4. In a fluid-operated machine, a plurality of fluid-operated mechanisms, valves for controlling the admission of fluid respectively to said different mechanisms, a rotatable drum having thereon members for controlling said valves to cause the different mechanisms to operate in predetermined time relation to one another, a fluid-operated motor for rotating said drum to cause the machine to perform a cycle of operations, a valve for admitting operating fluid to said motor to start the cycle of operations, said drum having also thereon a member for controlling said valve to terminate automatically the admission of fluid to said motor and thereby to stop the machine at the end of the cycle, and means movable by the operator for also controlling said valve to stop the machine prior to the end of the cycle.

5. In a fluid-operated machine, a plurality of fluid-operated mechanisms, valves for controlling the admission of fluid respectively to said different mechanisms, controlling means movable to initiate the operations of the different mechanisms in predetermined time relation to one another by control of said valves, a fluid-operated device for thus operating said controlling means, a valve for admitting operating fluid to said device, means for moving said valve into position thus to admit the fluid and for thereby starting the operation of the machine, a device for retaining the valve in that position, a spring for returning the valve when it is released by said retaining device, a portion of said controlling means being arranged to control said retaining device to cause it thus to release the valve and thereby automatically to stop the operation of the machine, and means movable by the operator for also controlling said retaining device to stop the operation of the machine before it is stopped by said fluid-operated controlling means.

6. In a fluid-operated machine, a plurality of fluid-operated mechanisms, valves for controlling the admission of fluid respectively to said different mechanisms, controlling means rotatable to initiate the operations of the different mechanisms in predetermined time relation to one another by control of said valves, a fluid-operated device for thus rotating said controlling means to cause the machine to perform a cycle of operations, a valve for admitting operating fluid to said device, means for moving said valve into position thus to admit the fluid and for thereby starting the cycle of operations, a device for retaining the valve in that position, a spring for returning the valve when it is released by said retaining device, said rotatable controlling means having a member for operating said retaining device thus to release the valve and thereby to stop the machine automatically at the end of the cycle, and means movable by the operator at will also to operate said retaining device and thereby to stop the machine prior to the end of the cycle.

7. In a fluid-operated machine, a plurality of fluid-operated mechanisms, valves for controlling the admission of fluid respectively to said different mechanisms, controlling means rotatable to initiate the operations of the different mechanisms in predetermined time relation to one another by control of said valves, a fluid-operated device for thus rotating said controlling means to cause the machine to perform a cycle of operations, a valve for admitting operating fluid to said device, means for moving said valve into position thus to admit the fluid and for thereby starting the cycle of operations, a latch for retaining the valve in that position, a spring for returning the valve when it is released by said latch, a lever movable by said rotatable controlling means to operate said latch to release the valve and thereby to stop the machine automatically at the end of the cycle, and means movable by the operator at will also to operate said lever and thereby to stop the machine prior to the end of the cycle.

8. In a fluid-operated machine, a plurality of fluid-operated mechanisms, valves for controlling the admission of fluid respectively to said different mechanisms, a rotatable drum having thereon members for controlling said valves to cause the different mechanisms to operate in predetermined time relation to one another, a fluid-operated motor for rotating said drum to cause the machine to perform a cycle of operations, a valve for admitting operating fluid to said motor, means for moving said valve into position thus to admit the fluid and for thereby starting the cycle of operations, a latch for retaining the valve in that position, a spring for returning the valve when it is released by said latch, said drum having also thereon a member for operating said latch thus to release the valve and thereby to stop the machine automatically at the end of the cycle, and means to enable the operator at will also to release said valve and thereby to stop the machine prior to the end of the cycle.

9. In a fluid-operated machine, a plurality of fluid-operated mechanisms, a chamber for fluid under pressure, a pump for maintaining pressure in said chamber, valves for controlling the admission of fluid respectively from said chamber to said different mechanisms, controlling means rotatable to initiate the operations of the different mechanisms in predetermined time relation to one another by control of said valves, a fluid-operated device for thus rotating said controlling means to cause the machine to perform a cycle of operations, a valve movable to admit operating fluid to said device, starting means for causing said valve thus to admit the fluid and for thereby starting the cycle of operations, a portion of said controlling means being arranged to control said valve to terminate automatically the admission of fluid to said device and thereby to stop the machine at the end of the cycle, and means movable by the operator for also controlling said valve to stop the machine prior to the end of the cycle while pressure is maintained in said chamber, said valve being thereafter movable again in response to movement of said starting means to cause the machine to continue its cycle from the point where it was stopped by the operator.

10. In a fluid-operated machine, a plurality of fluid-operated mechanisms, valves for controlling the admission of fluid respectively to said different mechanisms, a controlling device rotatable to initiate the operations of the different mechanisms in predetermined time relation to one another by control of said valves, power-operated means for thus rotating said controlling device to cause the machine to perform a cycle of operations, a starting member movable to start said power-operated means, mechanism movable by the operator at will to stop the operation of said power-operated means prior to the end of the cycle, said controlling device being thereafter further rotatable by the operator to its normal starting position, a stop member for limiting the movement of said device when it is thus rotated by the operator, and means controlled by said starting member for rendering said stop member inoperative when a new cycle of operations is initiated.

11. In a fluid-operated machine, a plurality of fluid-operated mechanisms, valves for controlling the admission of fluid respectively to said different mechanisms, a controlling device rotatable to initiate the operations of the different mechanisms in predetermined time relation to one another by control of said valves, fluid-operated means for thus rotating said controlling device to cause the machine to perform a cycle of operations, a valve for admitting operating fluid to said fluid-operated means, starting means for controlling said valve to initiate the cycle of operations, means movable by the operator for also controlling said valve to stop the machine prior to the end of the cycle, means enabling the operator thereafter to complete the rotation of said controlling device, a stop member for limiting the movement of said device when it is thus rotated by the operator, and mechanism controlled by said starting means for moving said stop member out of its limiting position when a new cycle of operations is initiated.

12. In a fluid-operated machine, a plurality of fluid-operated mechanisms, valves for controlling the admission of fluid respectively to said different mechanisms, a rotatable drum having thereon members for controlling said valves to cause the different mechanisms to operate in predetermined time relation to one another, a fluid-operated motor for rotating said drum to cause the machine to perform a cycle of operations, a valve for admitting operating fluid to said motor, a treadle movable to start the cycle of operations by control of said valve, means movable by the operator for also controlling said valve to stop the machine prior to the end of the cycle, said drum being thereafter further rotatable by the oprator to its normal starting position, a stop member for limiting the movement of the drum when it is thus rotated by the operator, and means for withdrawing said stop member from operative position in response to movement of the treadle to initiate a new cycle of operations.

BERNHARDT JORGENSEN.